United States Patent
Takata et al.

(10) Patent No.: US 11,010,135 B2
(45) Date of Patent: May 18, 2021

(54) ARITHMETIC PROCESSING DEVICE AND CONTROL METHOD OF ARITHMETIC PROCESSING DEVICE

(71) Applicant: FUJITSU LIMITED, Kawasaki (JP)

(72) Inventors: Ryo Takata, Kawasaki (JP); Takeshi Osonoi, Kawasaki (JP); Hiroyuki Wada, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 160 days.

(21) Appl. No.: 16/190,478

(22) Filed: Nov. 14, 2018

(65) Prior Publication Data

US 2019/0171419 A1 Jun. 6, 2019

(30) Foreign Application Priority Data

Dec. 6, 2017 (JP) .............................. JP2017-234121

(51) Int. Cl.
*G06F 7/556* (2006.01)
*G06F 7/544* (2006.01)
(Continued)

(52) U.S. Cl.
CPC ................ *G06F 7/556* (2013.01); *G06F 5/01* (2013.01); *G06F 7/544* (2013.01); *G06F 7/5446* (2013.01);
(Continued)

(58) Field of Classification Search
CPC ........ G06F 7/544; G06F 7/5446; G06F 7/556; G06F 7/548; G06F 2101/04; G06F 5/01; G06N 3/0454; G06N 3/0481; G06N 3/063
(Continued)

(56) References Cited

U.S. PATENT DOCUMENTS

| 4,888,721 A | 12/1989 | Kondoh et al. |
| 2010/0214936 A1 | 8/2010 | Ito et al. |

(Continued)

FOREIGN PATENT DOCUMENTS

| JP | 63-184135 | 7/1988 |
| JP | 06-215021 | 8/1994 |

(Continued)

OTHER PUBLICATIONS

D. Patterson et al., Computer Organization and Design, the Hardware/Software Interface, Elsevier, 3rd ed., 2005 (Year: 2005).*

(Continued)

*Primary Examiner* — Aimee Li
*Assistant Examiner* — Emily E Larocque
(74) *Attorney, Agent, or Firm* — Fujitsu Patent Center

(57) ABSTRACT

An arithmetic processing device includes a processor that calculates a constant multiplication value by multiplying a constant value obtained by dividing a first value by a natural logarithm of 2 and a data value, separates the constant multiplication value into an integer portion and a fractional portion, calculates a fractional power value corresponding to a value of the fractional portion, calculates an integer power value corresponding to a value obtained by multiplying a value of the integer portion by a second value, calculates a power addition value by adding the fractional power value and the integer power value, calculate a power subtraction value by subtracting the integer power value from the fractional power value, and calculate a division value by dividing the power subtraction value by the power addition value as a result of an execution of an arithmetic operation of a hyperbolic tangent function with the data value.

15 Claims, 6 Drawing Sheets

(51) Int. Cl.
*G06F 5/01* (2006.01)
*G06N 3/04* (2006.01)
*G06N 3/063* (2006.01)

(52) U.S. Cl.
CPC ......... *G06N 3/0454* (2013.01); *G06N 3/0481* (2013.01); *G06N 3/063* (2013.01)

(58) Field of Classification Search
USPC ....................................................... 708/440
See application file for complete search history.

(56) References Cited

U.S. PATENT DOCUMENTS

| 2012/0121173 | A1  | 5/2012 | Aisaka et al. |
| 2019/0042924 | A1* | 2/2019 | Pasca .................. G06N 3/0481 |

FOREIGN PATENT DOCUMENTS

| JP | 2003-099244 | 4/2003 |
| JP | 2009-080693 | 4/2009 |
| JP | 2010-262506 | 11/2010 |
| JP | 2017-027314 | 2/2017 |

OTHER PUBLICATIONS

I. Nascimento et al., A new solution to the hyperbolic tangent implementation in hardware: polynomial modeling of the fractional exponential part, Neural Comput & Applic (2013) 23: 363-369, 2012 (Year: 2012).*
C.W Lin et al., A Digital Circuit Design of Hyperbolic Tangent Sigmoid Function for Neural Networks, IEEE 2008 (Year: 2008).*
D.R. Llamocca-Obregon et al., A Fixed-Point Implementation of the Expanded Hyperbolic Cordie Algorithm, Latin American Applied Research 37:83-91, 2007 (Year: 2007).*
F. Mahmoud, Calculus: Early Transcendental Functions Lecture Notes for Calculus 101, http://www.philadelphia.edu.jo/academics/fawad/uploads/250101_book_fawad.pdf, 2012 (Year: 2012).*
J. S. Walther, "A unified algorithm for elementary functions", Spring Joint Computer Conference, 1971, pp. 379-385 (7 pages).

* cited by examiner

ARITHMETIC PROCESSING DEVICE AND CONTROL METHOD OF ARITHMETIC PROCESSING DEVICE

CROSS-REFERENCE TO RELATED APPLICATION

This application is based upon and claims the benefit of priority of the prior Japanese Patent Application No. 2017-234121, filed on Dec. 6, 2017, the entire contents of which are incorporated herein by reference.

FIELD

The embodiments discussed herein are related to an arithmetic processing device and a control method of the arithmetic processing device.

BACKGROUND

A conversion processing is performed using a function such as, for example, a hyperbolic tangent function (tan h).

Related techniques are disclosed in, for example, Japanese Laid-open Patent Publication Nos. 2010-262506, 2009-080693, 2017-027314, 63-184135, and 2003-099244.

SUMMARY

According to one aspect of the embodiments, an arithmetic processing device includes: a memory; and a processor coupled to the memory and the processor configured to: calculate a constant multiplication value by multiplying a constant value obtained by dividing a first value by a natural logarithm of 2 and a data value stored in the memory; separate the constant multiplication value into an integer portion and a fractional portion; calculate a fractional power value expressed as a power of 2 having a value of the fractional portion of the constant multiplication value as an exponent; calculate an integer power value expressed as a power of 2 having a value obtained by multiplying a value of the integer portion of the constant multiplication value by a second value as an exponent; calculate a power addition value by adding the fractional power value and the integer power value; calculate a power subtraction value by subtracting the integer power value from the fractional power value; and calculate a division value by dividing the power subtraction value by the power addition value as a result of an execution of an arithmetic operation of a hyperbolic tangent function with the data value.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

Figure 1:
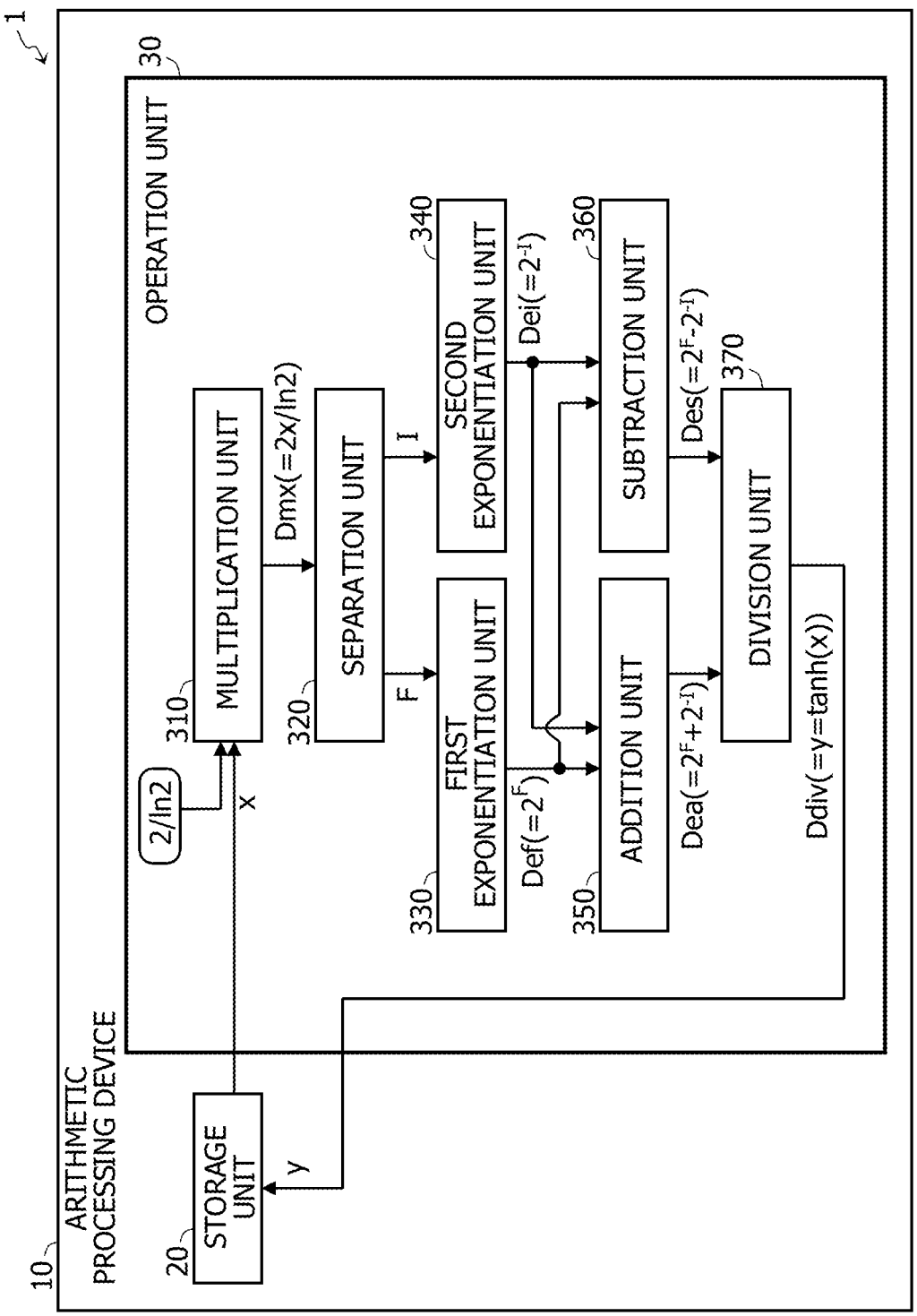
FIG. 1 illustrates an example of an arithmetic processing device and a control method of the arithmetic processing device.

A conversion processing using a function such as, for example, a hyperbolic tangent function (tan h) is performed using a function table in which predetermined function values which are output values for respective input values are stored in advance. For example, the function table is stored in a storage unit such as, for example, a memory included in an arithmetic processing device. For example, a COordinate Rotation DIgital Computer (CORDIC) algorithm is used as a method of executing the arithmetic operation of, for example, a trigonometric function, a hyperbolic function or the like. For example, an arithmetic processing device expresses the arithmetic operation of an argument by a recurrence formula based on an expansion obtained by expanding an argument of the arithmetic operation of, for example, a hyperbolic sine function (sin h) or a hyperbolic cosine function (cos h) by a power of 2 and executes the arithmetic operation of the argument by an iterative calculation based on the recurrence formula.

For example, in an arithmetic processing device that calculates a hyperbolic tangent function using a function table, the circuit scale may increase since the function table is stored in a storage unit. For example, as the number of possible values of the input values in the function table increases, the scale of the function table increases and the circuit scale of the arithmetic processing device increases.

For example, a CORDIC circuit that implements the CORDIC algorithm by hardware includes, for example, a lookup table in which constants used in the CORDIC algorithm are stored, an operator used for the calculation of an approximate value, and a shifter which shifts data. For example, as the number of constants stored in the lookup table increases, the scale of the CORDIC circuit increases. Therefore, in an arithmetic processing device that calculates a hyperbolic tangent function using the CORDIC circuit, the circuit scale may increase. In addition to the CORDIC circuit, the arithmetic processing device that calculates the hyperbolic tangent function using the CORDIC circuit includes, for example, a division operator which divides the value of a hyperbolic sine function calculated by the CORDIC circuit by the value of a hyperbolic cosine function, and a shifter which normalizes a divisor to be input to the division operator.

For example, a technique may be provided to reduce the circuit scale of an arithmetic processing device that executes the arithmetic operation of a hyperbolic tangent function.

Hereinafter, the same reference characters as data are used for the values indicated by the data.

FIG. 1 illustrates an example of an arithmetic processing device and a control method of the arithmetic processing device. The arithmetic processing device 10 illustrated in FIG. 1 is, for example, a processor such as, for example, a central processing unit (CPU) and is included in an information processing apparatus 1 such as, for example, a server or a super computer. The arithmetic processing device 10 includes a storage unit 20 such as, for example, a register file which stores a data value x and an operation unit 30 which executes the arithmetic operation of a hyperbolic tangent function using the data value x stored in the storage unit 20.

For example, a hyperbolic tangent function "y=tanh(x)" in a case where the data value x is a variable x is expressed by Equation (1) using a value I of the integer portion of "2x/ln 2" and a value F of the fractional portion of "2x/ln 2".

$$\begin{aligned} y &= \tanh(x) \\ &= (e^x - e^{-x})/(e^x + e^{-x}) \\ &= (e^{2x} - 1)/(e^{2x} + 1) \\ &= (2^{2x/\ln 2} - 1)/(2^{2x/\ln 2} + 1) \\ &= (2^{I+F} - 1)/(2^{I+F} + 1) \\ &= (2^F - 2^{-I})/(2^F + 2^{-I}) \end{aligned} \quad (1)$$

The reference character "ln" indicates the natural logarithm. In addition, the reference character "e" is the Napier number which is the base of the natural logarithm.

The operation unit 30 executes the arithmetic operation of the hyperbolic tangent function based on the above-described Equation (1). For example, the operation unit 30 includes a multiplication unit 310, a separation unit 320, a first exponentiation unit 330, a second exponentiation unit 340, an addition unit 350, a subtraction unit 360, and a division unit 370.

The multiplication unit 310 calculates a constant multiplication value Dmx by multiplying a constant value "2/ln 2" and the data value x transferred from the storage unit 20 to the operation unit 30, and transfers the calculated constant multiplication value Dmx to the separation unit 320. The constant multiplication value Dmx is "2x/ln 2" in Equation (1). In addition, the constant value "2/ln 2" is stored in advance in a storage device such as, for example, a main memory (not illustrated) outside the arithmetic processing device 10 and is transferred from the storage device to a register (not illustrated) included, for example, in the multiplication unit 310. Alternatively, the constant value "2/ln 2" may be stored in advance in the register (not illustrated) included, for example, in the multiplication unit 310.

The separation unit 320 separates the constant multiplication value Dmx into the integer portion and the fractional portion. The separation unit 320 transmits the value F of the fractional portion of the constant multiplication value Dmx to the first exponentiation unit 330, and transmits the value I of the integer portion of the constant multiplication value Dmx to the second exponentiation unit 340. The value F is "F" in Equation (1), and the value I is "I" in Equation (1).

The first exponentiation unit 330 calculates a fractional power value Def $(=2^F)$ that is expressed as a power of 2, taking the value F of the fractional portion of the constant multiplication value Dmx as an exponent. The first exponentiation unit 330 transfers the fractional power value Def to the addition unit 350 and the subtraction unit 360. For example, the first exponentiation unit 330 is implemented by an exponentiation operator that executes the calculation of a power of 2 (an arithmetic operation of an exponential function with the base of 2).

The second exponentiation unit 340 calculates an integer power value Dei $(=2^{-I})$ that is expressed as a power of 2, taking a value obtained by multiplying the value I of the integer portion of the constant multiplication value Dmx by "−1" as an exponent. The second exponentiation unit 340 transfers the integer power value Dei to the addition unit 350 and the subtraction unit 360.

Since the value I is an integer, the second exponentiation unit 340 may calculate the integer power value Dei $(=2^{-I})$ by setting a bit which is determined in advance according to the value I to "1" in a case where the integer power value Dei is expressed by a binary number. For example, the function of the second exponentiation unit 340 may be implemented by a decoder.

The addition unit 350 calculates a power addition value Dea $(=2^F+2^{-I})$ by adding the fractional power value Def $(=2^F)$ and the integer power value Dei $(=2^{-I})$. The addition unit 350 transfers the power addition value Dea to the division unit 370.

The subtraction unit 360 calculates a power subtraction value Des $(=2^F-2^{-I})$ by subtracting the integer power value Dei $(=2^{-I})$ from the fractional power value Def $(=2^F)$. The subtraction unit 360 transfers the power subtraction value Des to the division unit 370.

The division unit 370 calculates a division value Ddiv by dividing the power subtraction value Des by the power addition value Dea as the result y $(=\tan h(x))$ of executing the arithmetic operation of the hyperbolic tangent function with the data value x. The operation unit 30 stores the division value Ddiv as the result y of executing the arithmetic operation of the hyperbolic tangent function with the data value x in the storage unit 20.

In this manner, the operation unit 30 calculates the constant multiplication value Dmx by multiplying the constant value "2/ln 2" and the data value x, and separates the constant multiplication value Dmx into the integer portion (value I) and the fractional portion (value F). The operation unit 30 calculates the fractional power value Def expressed as "$2^F$" and the integer power value Dei expressed as "$2^{-I}$". In addition, the operation unit 30 calculates the power addition value Dea by adding the fractional power value Def and the integer power value Dei, and calculates the power subtraction value Des by subtracting the integer power value Dei from the fractional power value Def. The operation unit 30 calculates the division value Ddiv by dividing the power subtraction value Des by the power addition value Dea as the result y of executing the arithmetic operation of the hyperbolic tangent function with the data value x.

For example, the operation unit 30 may calculate the result y $(=\tan h(x))$ of executing the arithmetic operation of the hyperbolic tangent function with the data value x, rather than calculating respective values of a hyperbolic sine function (sin h) and a hyperbolic cosine function (cos h). Thus, the operation unit 30 may calculate the result y $(=\tan h(x))$ of executing the arithmetic operation of the hyperbolic tangent function with the data value x without using a CORDIC circuit that calculates respective values of a hyperbolic sine function and a hyperbolic cosine function. As a result, it is possible to reduce the circuit scale of the arithmetic processing device 10 that executes the arithmetic operation of the hyperbolic tangent function as compared with a case of using the CORDIC circuit.

For example, the multiplication unit 310, the first exponentiation unit 330, and the division unit 370 are implemented using a multiplier, an exponentiation operator that executes the calculation of a power of 2 (arithmetic operation of an exponential function with the base of 2), and a divider which are included in an existing operation unit. Therefore, in a case of adding an operator that executes the arithmetic operation of the hyperbolic tangent function on the existing operation unit including, for example, the multiplier, the exponentiation operator, and the divider, it is possible to reduce the scale of a circuit that is newly added as compared with a case of using the CORDIC circuit.

The configuration of the arithmetic processing device 10 and the control method of the arithmetic processing device 10 are not limited to the example illustrated in FIG. 1. For example, when the data value x transferred from the storage unit 20 to the operation unit 30 is a negative value, the multiplication unit 310 may calculate the constant multiplication value Dmx by multiplying the absolute value |x| of the data value x by the constant value "2/ln 2". In this case, the operation unit 30 stores the value (=−tanh(|x|)) obtained by multiplying the division value Ddiv calculated by the division unit 370 by "−1" as the result y (=tan h(x)) of executing the arithmetic operation of the hyperbolic tangent function with the data value x, in the storage unit 20.

As described above, in an embodiment illustrated in FIG. 1, the operation unit 30 executes the arithmetic operation of the hyperbolic tangent function based on Equation (1) that expresses the hyperbolic tangent function tan h(x) of the variable x using the value I of the integer portion of "2x/ln 2" and the value F of the fractional portion of "2x/ln 2". For example, the operation unit 30 calculates the value I of the integer portion and the value F of the fractional portion of the constant multiplication value Dmx obtained by multiplying the constant value "2/ln 2" and the data value x, and calculates the fractional power value Def expressed as "$2^F$" and the integer power value Dei expressed as "$2^{-I}$". The operation unit 30 calculates the division value Ddiv by dividing the power subtraction value Des obtained by subtracting the integer power value Dei from the fractional power value Def by the power addition value Dea obtained by adding the fractional power value Def and the integer power value Dei. The division value Ddiv is the result y of executing the arithmetic operation of the hyperbolic tangent function with the data value x. In this way, the operation unit 30 may execute the arithmetic operation of the hyperbolic tangent function without using the CORDIC circuit that calculates respective values of a hyperbolic sine function and a hyperbolic cosine function. As a result, it is possible to reduce the circuit scale of the arithmetic processing device 10 that executes the arithmetic operation of the hyperbolic tangent function.

Figure 2:
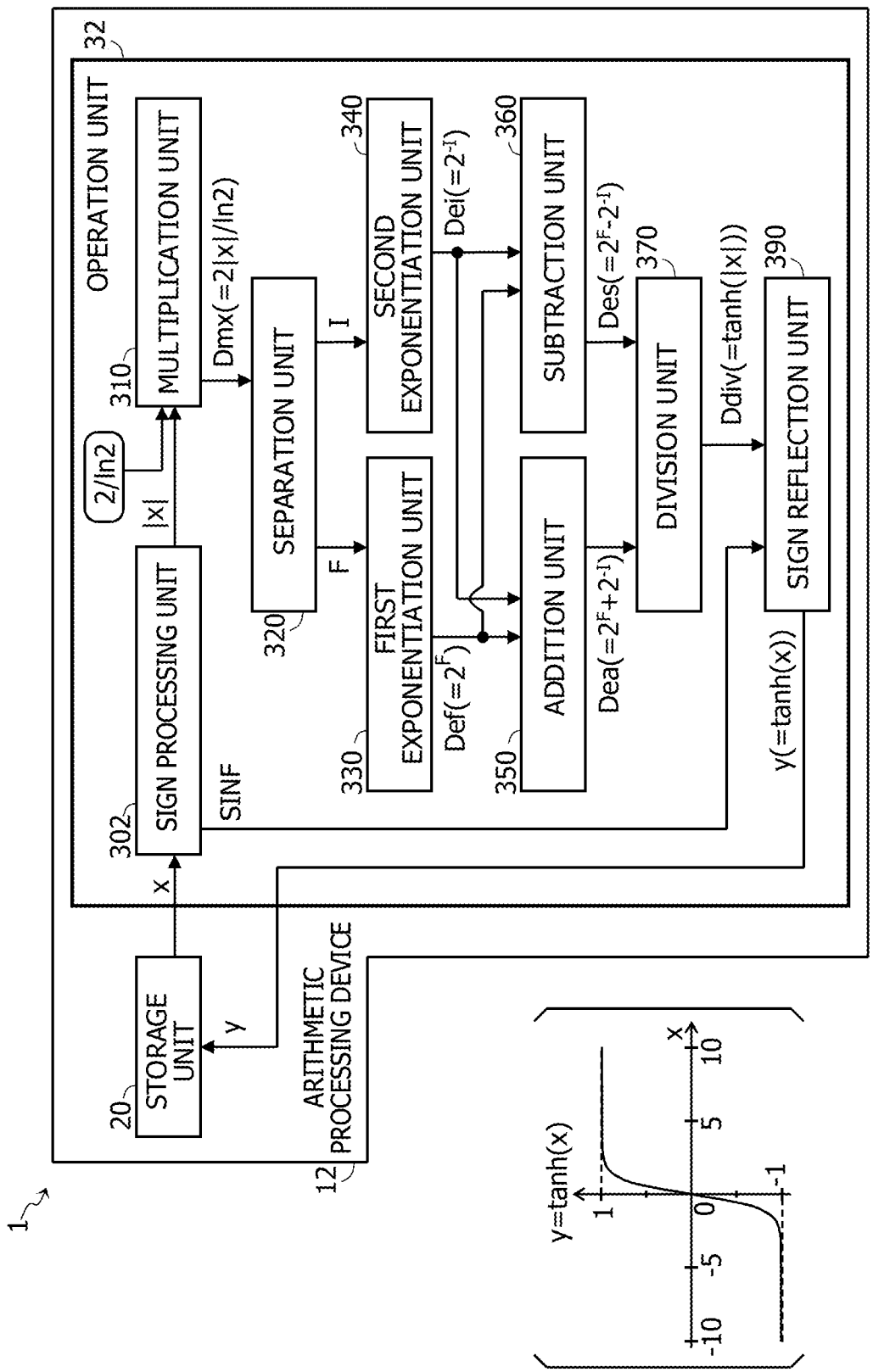
FIG. 2 illustrates an example of an arithmetic processing device and a control method of the arithmetic processing device.

FIG. 2 illustrates an example of an arithmetic processing device and a control method of the arithmetic processing device. The same or similar reference numerals will be given to the same or similar elements as those described in FIG. 1, and detailed descriptions thereof will be omitted. The arithmetic processing device 12 illustrated in FIG. 2 is, for example, a processor such as, for example, a CPU and is included in the information processing apparatus 1 such as, for example, a server or a super computer. The arithmetic processing device 12 is the same as or similar to the arithmetic processing device 10 illustrated in FIG. 1 except that the arithmetic processing device 12 includes an operation unit 32 instead of the operation unit 30 illustrated in FIG. 1. For example, the arithmetic processing device 12 includes the storage unit 20 such as, for example, the register file which stores the data value x, and the operation unit 32 which executes the arithmetic operation of the hyperbolic tangent function using the data value x stored in the storage unit 20.

Since the hyperbolic tangent function is an odd function as illustrated in the bracket in FIG. 2, when the data value x is negative, the operation unit 32 illustrated in FIG. 2 adds a negative sign to the result Ddiv of executing the arithmetic operation of the hyperbolic tangent function with the absolute value |x| of the data value x. Thus, the result y of executing the arithmetic operation of the hyperbolic tangent function with the data value x is obtained. For example, the extraction and addition of the sign of the data value x are executed by a sign processing unit 302 and a sign reflection unit 390 (to be described later).

The operation unit 32 is the same as or similar to the operation unit 30 illustrated in FIG. 1 except that the sign processing unit 302 and the sign reflection unit 390 are added to the operation unit 30 illustrated in FIG. 1. For example, the operation unit 32 includes the sign processing unit 302, the multiplication unit 310, the separation unit 320, the first exponentiation unit 330, the second exponentiation unit 340, the addition unit 350, the subtraction unit 360, the division unit 370, and the sign reflection unit 390.

The sign processing unit 302 extracts the sign of the data value x transferred from the storage unit 20 to the operation unit 32, and outputs sign information . . . F indicating the sign of the data value x to the sign reflection unit 390. The sign processing unit 302 outputs the absolute value |x| of the data value x transferred from the storage unit 20 to the operation unit 32 as the data value x that is multiplied by the constant value "2/ln 2" to the multiplication unit 310.

The multiplication unit 310, the separation unit 320, the first exponentiation unit 330, the second exponentiation unit 340, the addition unit 350, the subtraction unit 360, and the division unit 370 are the same as or similar to those in the embodiment illustrated in FIG. 1. For example, since the multiplication unit 310 receives the absolute value |x| of the data value x as the data value x, the multiplication unit 310 calculates the constant multiplication value Dmx (=2|x|/ln 2) by multiplying the constant value "2/ln 2" and the absolute value |x| of the data value x, and transfers the calculated constant multiplication value Dmx to the separation unit 320. Therefore, the division value Ddiv calculated by the division unit 370 indicates the result (tan h (|x|)) of executing the arithmetic operation of the hyperbolic tangent function with the absolute value |x| of the data value x.

The sign reflection unit 390 receives the division value Ddiv as the result (tan h (|x|)) of executing the arithmetic operation of the hyperbolic tangent function with the absolute value |x| of the data value x from the division unit 370, and receives the sign information SINF indicating the sign of the data value x from the sign processing unit 302. The sign reflection unit 390 reflects the sign of the data value x in the result Ddiv of executing the arithmetic operation of the hyperbolic tangent function with the absolute value |x| of the data value x. For example, the sign reflection unit 390 adds the sign indicated by the sign information SIN F to the division value Ddiv. The sign reflection unit 390 outputs the division value Ddiv to which the sign indicated by the sign information SIN F has been added, for example, the reflection result of the sign as the result y (=tan h(x)) of executing the arithmetic operation of the hyperbolic tangent function with the data value x to the storage unit 20. As described above, when the data value x is negative, the arithmetic processing device 12 adds a negative sign to the result Ddiv of executing the arithmetic operation of the hyperbolic tangent function with the absolute value |x| of the data value x.

In the arithmetic processing device 12, since the absolute value |x| of the data value x is transferred to the multiplication unit 310, respective input values received by the multiplication unit 310, the separation unit 320, the first exponentiation unit 330, the second exponentiation unit 340, the addition unit 350, the subtraction unit 360, and the division unit 370 are 0 or more. For example, since the constant multiplication value Dmx is 0 or more, the value F is a real number of 0 or more and less than 1, and the value I is a nonnegative integer of 0 or more. Therefore, the power subtraction value Des ($=2^F-2^{-I}$) is in the range of 0 or more and less than 2 and the power addition value Dea ($=2^F+2^{-I}$) is in the range of 1 or more and less than 3. Since the possible range of the power addition value Dea ($=2^F+2^{-I}$) which is transferred as a divisor to the division unit 370 is 1 or more and less than 3, when division is performed by normalizing the value of the divisor to a predetermined range, it is possible to reduce the circuit scale of, for example, a shifter that normalizes the power addition value Dea (divisor). In this way, it is possible to reduce the circuit scale of a block including the multiplication unit 310, the separation unit 320, the first exponentiation unit 330, the second exponentiation unit 340, the addition unit 350, the subtraction unit 360, and the division unit 370 as compared with a case of processing a negative value.

In the arithmetic processing unit 12, as described above, the power subtraction value Des ($=2^F-2^{-I}$) is in the range of 0 or more and less than 2 and the power addition value Dea ($=2^F+2^{-I}$) is in the range of 1 or more and less than 3. For example, the power subtraction value Des and the power addition value Dea which are calculated as intermediate calculation results in the arithmetic operation of the hyperbolic tangent function do not diverge. Therefore, the arithmetic processing device 12 may execute the arithmetic operation of the hyperbolic tangent function without taking a countermeasure against, for example, an exception handling for divergence by software.

The configuration of the arithmetic processing device 12 and the control method of the arithmetic processing device 12 are not limited to the example illustrated in FIG. 2. For example, the hyperbolic tangent function "y=tan h(x)" asymptotically approaches y=1 when the data value x is infinite as illustrated in the bracket in FIG. 2. Therefore, when the absolute value |x| of the data value x is equal to or greater than a predetermined value, the operation unit 32 may include a selection unit which replaces the division value Ddiv with "1" and outputs the replaced value to the sign reflection unit 390.

As described above, in the embodiment illustrated in FIG. 2, it is also possible to obtain the same effects as in the embodiment illustrated in FIG. 1. For example, the operation unit 32 executes the arithmetic operation of the hyperbolic tangent function based on Equation (1) described in FIG. 1, for example, the equation that expresses the hyperbolic tangent function "y=tan h(x)" using the value I of the integer portion and the value F of the fractional portion of "2x/ln 2". Thus, the operation unit 32 may execute the arithmetic operation of the hyperbolic tangent function without using the CORDIC circuit. As a result, it is possible to reduce the circuit scale of the arithmetic processing device 12 that executes the arithmetic operation of the hyperbolic tangent function.

In addition, when the data value x is negative, the arithmetic processing device 12 adds a negative sign to the result Ddiv of executing the arithmetic operation of the hyperbolic tangent function with the absolute value |x| of the data value x. Thus, it is possible to reduce the circuit scale of a block including the multiplication unit 310, the separation unit 320, the first exponentiation unit 330, the second exponentiation unit 340, the addition unit 350, the subtraction unit 360, and the division unit 370 as compared with a case of processing a negative value. As a result, it is possible to reduce the circuit scale of the arithmetic processing device 12 that executes the arithmetic operation of the hyperbolic tangent function.

Figure 3:
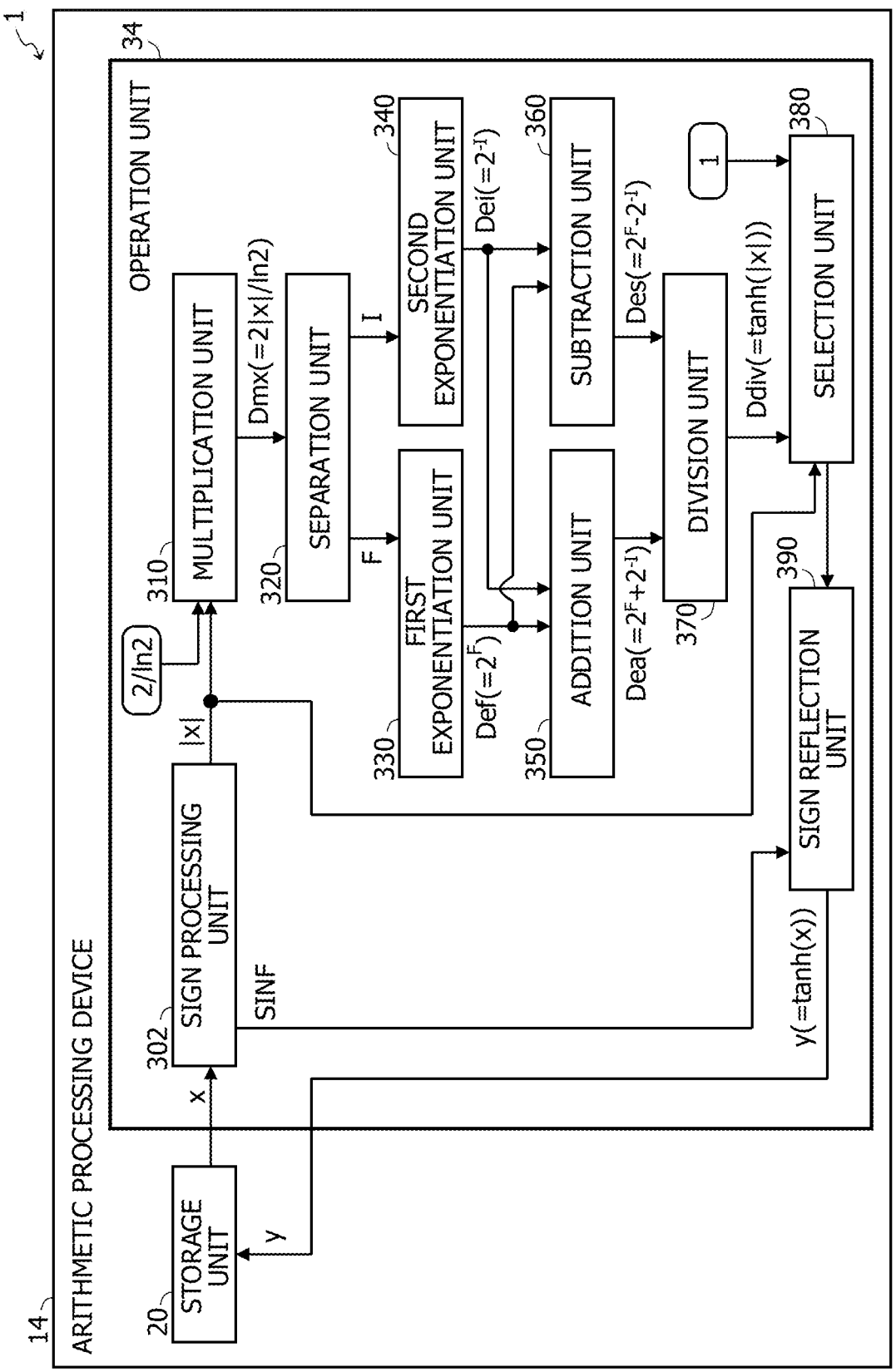
FIG. 3 illustrates an example of an arithmetic processing device and a control method of the arithmetic processing device.

FIG. 3 illustrates an example of an arithmetic processing device and a control method of the arithmetic processing device. The same or similar reference numerals will be given to the same or similar elements as those described in FIGS. 1 and 2, and detailed descriptions thereof will be omitted. The arithmetic processing device 14 illustrated in FIG. 3 is, for example, a processor such as, for example, a CPU and is included in the information processing apparatus 1 such as, for example, a server or a super computer. The arithmetic processing device 14 is the same as or similar to the arithmetic processing unit 12 illustrated in FIG. 2 except that the arithmetic processing device 14 includes an operation unit 34 instead of the operation unit 32 illustrated in FIG. 2. For example, the arithmetic processing device 14 includes the storage unit 20 such as, for example, the register file which stores the data value x, and the operation unit 34 which executes the arithmetic operation of the hyperbolic tangent function using the data value x stored in the storage unit 20.

The operation unit 34 illustrated in FIG. 3 is the same as or similar to the operation unit 32 illustrated in FIG. 2 except that a selection unit 380 is added to the operation unit 32 illustrated in FIG. 2. For example, the operation unit 34 includes the sign processing unit 302, the multiplication unit 310, the separation unit 320, the first exponentiation unit 330, the second exponentiation unit 340, the addition unit 350, the subtraction unit 360, the division unit 370, the selection unit 380, and the sign reflection unit 390.

The multiplication unit 310, the separation unit 320, the first exponentiation unit 330, the second exponentiation unit 340, the addition unit 350, the subtraction unit 360, the division unit 370, and the sign reflection unit 390 are the same as or similar to those in the embodiment illustrated in FIG. 2. The sign reflection unit 390 reflects the sign of the data value x to the value received from the selection unit 380 (either the division value Ddiv or "1") and outputs the reflection result to the storage unit 20 as the result y (=tan h(x)) of executing the arithmetic operation of the hyperbolic tangent function with the data value x.

The selection unit 380 receives the division value Ddiv as the result (tan h(|x|)) of executing the arithmetic operation of the hyperbolic tangent function with the absolute value |x| of the data value x from the division unit 370, and receives the absolute value |x| of the data value x from the sign processing unit 302. When the absolute value |x| of the data value x is less than a predetermined value, the selection unit 380 outputs the division value Ddiv as the result (tan h(|x|)) of executing the arithmetic operation of the hyperbolic tangent function with the absolute value |x| of the data value x to the sign reflection unit 390.

In addition, when the absolute value |x| of the data value x is equal to or greater than the predetermined value, the selection unit 380 outputs "1" as the result (tan h(|x|)) of executing the arithmetic operation of the hyperbolic tangent function with the absolute value |x| of the data value x to the sign reflection unit 390. For example, the value "1" is stored in advance in a register (not illustrated) included, for example, in the selection unit 380. Alternatively, one of two data input terminals of the selection unit 380 may be fixed to the value "1".

In this manner, when the absolute value |x| of the data value x is equal to or greater than the predetermined value, the operation unit 34 outputs either "1" or "−1" according to the sign of the data value x regardless of the division value Ddiv as the result of executing the arithmetic operation of the hyperbolic tangent function with the data value x to the storage unit 20. In this case, each of the multiplication unit 310, the separation unit 320, the first exponentiation unit 330, the second exponentiation unit 340, the addition unit 350, the subtraction unit 360, and the division unit 370 may stop the processing. When the multiplication unit 310, the separation unit 320, the first exponentiation unit 330, the second exponentiation unit 340, the addition unit 350, the subtraction unit 360, and the division unit 370 stop the processing, it is possible to reduce the power consumption of the arithmetic processing device 14.

The configuration of the arithmetic processing device 14 and the control method of the arithmetic processing device 14 are not limited to the example illustrated in FIG. 3. For example, the selection unit 380 may be added to the operation unit 30 illustrated in FIG. 1. In this case, the selection unit 380 added to the operation unit 30 selects any one of the division value Ddiv, "1", and "−1" according to the magnitude of the data value x as the result of executing the arithmetic operation of the hyperbolic tangent function with the data value x. For example, when the absolute value |x| of the data value x is greater than or equal to a predetermined value, the selection unit 380 added to the operation unit 30 selects either "1" or "−1" according to the sign of the data value x regardless of the division value Ddiv as the result of executing the arithmetic operation of the hyperbolic tangent function with the data value x. When the absolute value |x| of the data value x is less than the predetermined value, the selection unit 380 added to the operation unit 30 selects the division value Ddiv as the result of executing the arithmetic operation of the hyperbolic tangent function with the data value x.

Figure 4:
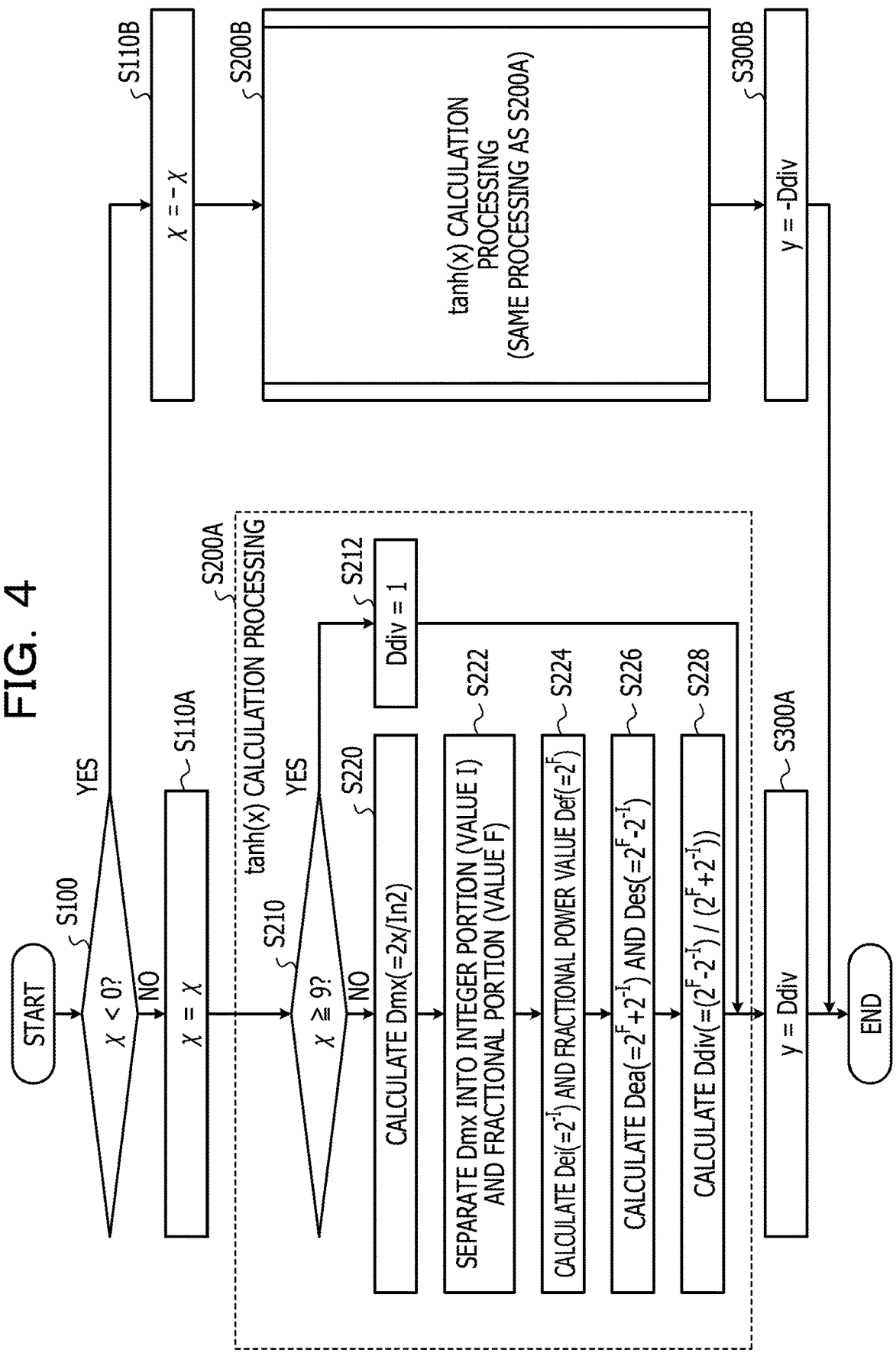
FIG. 4 illustrates an example of an operation of the arithmetic processing device.

FIG. 4 illustrates an example of an operation of the arithmetic processing device 14 illustrated in FIG. 3. The operation illustrated in FIG. 4 is an example of the control method of the arithmetic processing device 14. The example illustrated in FIG. 4 illustrates an operation of the operation unit 34 in a case of executing the arithmetic operation of the hyperbolic tangent function with the data value x.

In step S100, the sign processing unit 302 determines whether the data value x transferred from the storage unit 20 to the operation unit 34 is less than 0. When the data value x is 0 or more, the operation of the operation unit 34 proceeds to step S110A. In the meantime, when the data value x is less than 0, the operation of the operation unit 34 proceeds to step S110B.

In step S110A, the sign processing unit 302 outputs the data value x transferred from the storage unit 20 to the operation unit 34 as the data value x that is multiplied by the constant value "2/ln 2" to the multiplication unit 310 (x=x). Since the data value x transferred from the storage unit 20 to the operation unit 34 is 0 or more, the data value x is the same value as the absolute value |x| of the data value x. For example, the sign processing unit 302 outputs the absolute value |x| of the data value x transferred from the storage unit 20 to the operation unit 34 as the data value x that is multiplied by the constant value "2/ln 2" to the multiplication unit 310 (x=|x|).

Next, in step S200A, the operation unit 34 executes a tan h(x) calculation processing of calculating a value of the hyperbolic tangent function for the data value x. As illustrated in FIG. 4, the tan h(x) calculation processing includes a series of processings from step S210 to step S228.

For example, in step S210, the selection unit 380 determines whether the data value x transferred from the sign processing unit 302 to the multiplication unit 310 is 9 or more. The numerical value "9" is a numerical example of a predetermined value that is compared with the absolute value |x| of the data value x. The predetermined value is not limited to "9". When the data value x is 9 or more, the operation of the operation unit 34 proceeds to step S212. In the meantime, when the data value x is less than 9, the operation of the operation unit 34 proceeds to step S220.

In step S212, the selection unit 380 outputs "1" as the division value Ddiv to the sign reflection unit 390 (Ddiv=1). Thus, the tan h(x) calculation processing ends when the data value x is 9 or more, and the operation of the operation unit 34 proceeds to step S300A. In the meantime, when the data value x is less than 9, the operation unit 34 executes step S220 as described above.

In step S220, the multiplication unit 310 calculates the constant multiplication value Dmx (=2x/ln 2) by multiplying the constant value "2/ln 2" and the data value x received from the sign processing unit 302.

Next, in step S222, the separation unit 320 separates the constant multiplication value Dmx calculated in step S220 into the integer portion (value I) and the fractional portion (value F).

Next, in step S224, the operation unit 34 calculates the integer power value Dei ($=2^{-I}$) and the fractional power value Def ($=2^{F}$) using the value I of the integer portion and the value F of the fractional portion of the constant multiplication value Dmx separated in step S222. For example, the first exponentiation unit 330 calculates the fractional power value Def ($=2^{F}$), and the second exponentiation unit 340 calculates the integer power value Dei ($=2^{-I}$).

Next, in step S226, the operation unit 34 calculates the power addition value Dea ($=2^{F}+2^{-I}$) and the power subtraction value Des ($=2^{F}-2^{-I}$) using the integer power value Dei and the fractional power value Def calculated in step S224. For example, the addition unit 350 calculates the power addition value Dea ($=2^{F}+2^{-I}$) and the subtraction unit 360 calculates the power subtraction value Des ($=2^{F}-2^{-I}$).

Next, in step S228, the division unit 370 calculates a division value Ddiv($=(2^{F}-2^{-I})/(2^{F}+2^{-I})$) by dividing the power subtraction value Des calculated in step S226 by the power addition value Dea calculated in step S226. Thus, the tan h(x) calculation processing ends when the data value x is less than 9, and the operation of the operation unit 34 proceeds to step S300A.

In step S300A, the sign reflection unit 390 stores the division value Ddiv calculated by the tan h(x) calculation processing in step S200A as the result y of executing the arithmetic operation of the hyperbolic tangent function with the data value x (y=Ddiv) in the storage unit 20. Thus, the operation of the operation unit 34 when the data value x transferred from the storage unit 20 to the operation unit 34 is 0 or more ends. In the meantime, when the data value x transferred from the storage unit 20 to the operation unit 34 is less than 0, the operation unit 34 executes step S110B as described above.

In step S110B, the sign processing unit 302 outputs the value (=−x) obtained by multiplying the data value x transferred from the storage unit 20 to the operation unit 34 by "−1" as the data value x that is multiplied by the constant value "2/ln 2" to the multiplication unit 310 (x=−x). Since the data value x transferred from the storage unit 20 to the operation unit 34 is less than 0, the value (=−x) obtained by multiplying the data value x by "−1" is equal to the absolute value |x| of the data value x. For example, the sign processing unit 302 outputs the absolute value |x| of the data value x transferred from the storage unit 20 to the operation unit 34 as the data value x that is multiplied by the constant value "2/ln 2" to the multiplication unit 310 (x=|x|).

Next, in step S200B, the operation unit 34 executes a tan h(x) calculation processing of calculating a value of the hyperbolic tangent function for the data value x. The tan h(x) calculation processing of step S200B is the same as the tan h(x) calculation processing of step S200A. By the tan h(x) calculation processing of step S200B, the division value Ddiv as the value of the hyperbolic tangent function for the data value x (=|x|) is transferred to the sign reflection unit 390. For example, when the data value x (=|x|) transferred from the sign processing unit 302 to the multiplication unit 310 is 9 or more, the selection unit 380 outputs "1" as the division value Ddiv to the sign reflection unit 390 (Ddiv=1). In addition, when the data value x (=|x|) transferred from the sign processing unit 302 to the multiplication unit 310 is less than 9, the selection unit 380 outputs the division value Ddiv $(=(2^F-2^{-I})/(2^F+2^{-I}))$ to the sign reflection unit 390. After executing the tan h(x) calculation processing of step S200B, the operation of the operation unit 34 proceeds to step S300B.

In step S300B, the sign reflection unit 390 stores the value obtained by multiplying the division value Ddiv calculated by the tan h(x) calculation processing of step S200B by "−1" as the result y of executing the arithmetic operation of the hyperbolic tangent function with the data value x in the storage unit 20 (y=−Ddiv). Thus, the operation of the operation unit 34 when the data value x transferred from the storage unit 20 to the operation unit 34 is less than 0 ends.

The operation of the arithmetic processing device 14 is not limited to the example illustrated in FIG. 4. For example, the determination processing of step S100 may be executed after the tan h(x) calculation processing is executed. In this case, instead of steps S110A and S110B, the sign processing unit 302 outputs the absolute value |x| of the data value x transferred from the storage unit 20 to the operation unit 34 as the data value x that is multiplied by the constant value "2/ln 2" to the multiplication unit 310. After executing the tan h(x) calculation processing using the absolute value |x| of the data value x, the operation unit 34 executes any one processing of steps S300A and S300B according to the determined result of the determination processing of step S100.

Figure 5:
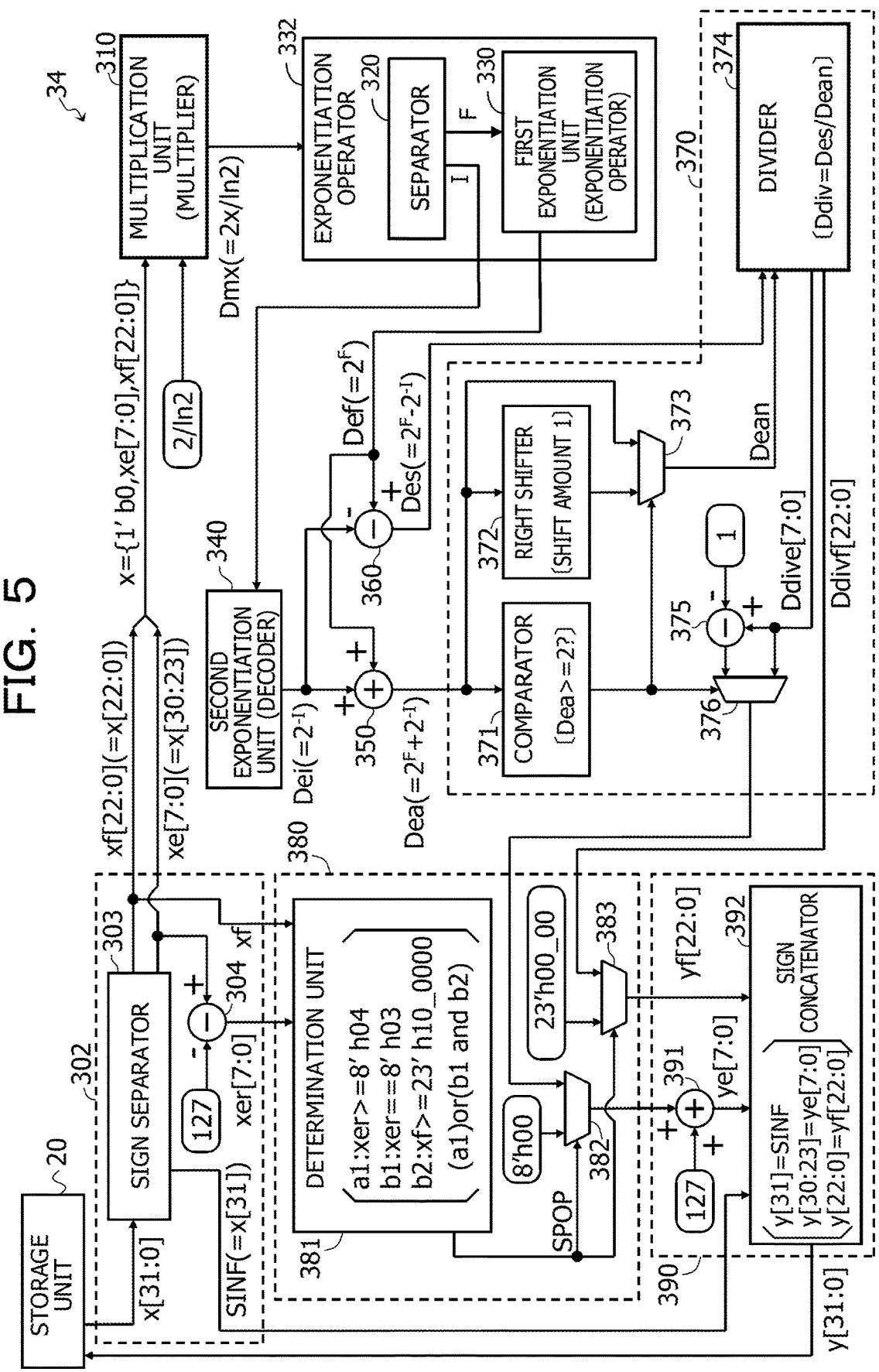
FIG. 5 illustrates an example of each block in an operation unit.

FIG. 5 illustrates an example of each block in the operation unit 34 illustrated in FIG. 3. In FIG. 5, in order to enable the easy understanding of the flow of data, for example, the storage unit 20 is also described. In FIG. 5, an operation of the operation unit 34 will be described by taking a case where the data transferred between the storage unit 20 and the operation unit 34 is 32 bits and the expression format of the data is a single precision floating point number that conforms to the Institute of Electrical and Electronics Engineers (IEEE) 754 as an example. The expression format of the data handled by the operation unit 34 is not limited to the single precision floating point number. For example, the expression format of the data handled by the operation unit 34 may be a fixed point number. In FIG. 5, the first number such as, for example, "8'h" or "1'b" at the head of data indicates the number of bits of data, "h" indicates a hexadecimal number, and "b" indicates a binary number.

In the example illustrated in FIG. 5, the multiplication unit 310 and the division unit 370 (e.g., a portion of the division unit 370) are implemented by using a multiplier and a divider 374 included in an existing arithmetic processing device. In addition, the separation unit 320 and the first exponentiation unit 330 are implemented by using an exponentiation operator 332 that executes the calculation of a power of 2 included in the existing arithmetic processing device (arithmetic operation of an exponential function with the base of 2). For example, the separation unit 320 is implemented by using a separating function that separates the integer portion and the fractional portion of data from each other, which is one of functions of the exponentiation operator 332. The first exponentiation unit 330 is implemented by using an exponentiation operation unit that executes the calculation of a power of 2 included in the exponentiation operator 332 (arithmetic operation of the exponential function with the base of 2).

The sign processing unit 302 includes a sign separator 303 and a subtracter 304. The sign separator 303 extracts data x[31] which is the sign bit of data x[31:0] transferred from the storage unit 20 to the operation unit 34 as sign information SIN F. The sign separator 303 outputs the sign information SIN F (=x[31]) extracted from the data x[31:0] to a sign concatenator 392 of the sign reflection unit 390 (to be described later).

The sign separator 303 extracts the exponent portion x[30:23] and the mantissa portion x[22:0] of the data x[31:0] as data xe[7:0] and data xf[22:0], respectively. The sign separator 303 outputs the data xe[7:0] which is the exponent portion x[30:23] of the data x[31:0] to the subtracter 304. The sign separator 303 outputs the data xf[22:0] which is the mantissa portion x[22:0] of the data x[31:0] to a determination unit 381 of the selection unit 380 (to be described later).

In addition, the sign separator 303 outputs the absolute value |x| of the data x[31:0] as the data x that is multiplied by the constant value "2/ln 2" to the multiplication unit 310. For example, the sign separator 303 outputs the data x (={1'b0, xe[7:0], xf[22:0]}) obtained by setting the sign bit of the data x[31:0] to "0" to the multiplication unit 310.

The subtracter 304 calculates data xer[7:0] by subtracting a bias value (=127) of the IEEE 754 expression from the data xe[7:0] received from the sign separator 303. The subtracter 304 outputs the data xer[7:0] obtained by subtracting "127" from the data xe[7:0] to the determination unit 381.

For example, the multiplication unit 310 calculates the constant multiplication value Dmx (=2x/ln 2) by multiplying the constant value "2/ln 2" and the data x received from the sign separator 303. The multiplication unit 310 outputs the constant multiplication value Dmx (=2x/ln 2) to the exponentiation operator 332.

The separation unit 320 separates the constant multiplication value Dmx received from the multiplication unit 310 into the integer portion and the fractional portion, outputs the value I of the integer portion of the constant multiplication value Dmx to the second exponentiation unit 340, and outputs the value F of the fractional portion of the constant multiplication value Dmx to the first exponentiation unit 330.

The first exponentiation unit 330 calculates the fractional power value Def ($=2^F$) using the value F of the fractional portion of the constant multiplication value Dmx received from the separation unit 320. The first exponentiation unit 330 outputs the calculated fractional power value Def ($=2^F$) to the addition unit 350 and the subtraction unit 360.

For example, the second exponentiation unit 340 is implemented by a decoder that sets a bit which is determined in advance according to input data among multiple bits of output data to "1". For example, the second exponentiation unit 340 sets a bit which is determined in advance according to the value I of the integer portion of the constant multiplication value Dmx received from the separation unit 320 among multiple bits of data indicating the integer power value Dei to "1". Thus, the integer power value Dei ($=2^{-I}$) is calculated. The second exponentiation unit 340 outputs the calculated integer power value Dei ($=2^{-I}$) to the addition unit 350 and the subtraction unit 360.

The addition unit 350 is implemented, for example, by an adder, and calculates the power addition value Dea ($=2^F+2^{-I}$) by adding the fractional power value Def received from the first exponentiation unit 330 and the integer power value Dei received from the second exponentiation unit 340. The addition unit 350 outputs the calculated power addition value Dea ($=2^F+2^{-I}$) to a comparator 371, a right shifter 372, and a selector 373 of the division unit 370 (to be described later).

The subtraction unit 360 is implemented, for example, by a subtracter, and calculates the power subtraction value Des ($=2^F-2^{-I}$) by subtracting the integer power value Dei received from the second exponentiation unit 340 from the fractional power value Def received from the first exponentiation unit 330. The subtraction unit 360 outputs the calculated power subtraction value Des ($=2^F-2^{-I}$) to the divider 374 of the division unit 370 (to be described later).

The division unit 370 includes the comparator 371, the right shifter 372, the selectors 373 and 376, the divider 374, and a subtracter 375. A block including the comparator 371, the right shifter 372, and the selector 373 is an example of a normalization unit that shifts and normalizes the power addition value Dea expressed by a predetermined number of bits.

The possible range of the power addition value Dea ($=2^F+2^{-I}$) transferred as a divisor to the division unit 370 is 1 or more and less than 3 since the value F is a real number of 0 or more and less than 1 and the value I is a nonnegative integer of 0 or more. Therefore, for example, in a case where the range of a divisor in the division by the divider 374 is determined to be 1 or more and less than 2, the power addition value Dea of 2 or more is shifted and normalized by a shift amount that falls within the range of 1 or more and less than 2.

For example, the comparator 371 compares the power addition value Dea received from the addition unit 350 with the value "2", and outputs the comparison result indicating whether the power addition value Dea is 2 or more to the selectors 373 and 376 as a selection control signal.

The right shifter 372 shifts the power addition value Dea received from the addition unit 350 (for example, data indicating the power addition value Dea) by one bit to the right. Thus, the power addition value Dea of 2 or more is normalized within the range of 1 or more and less than 2. The right shifter 372 outputs the right-shifted power addition value Dea to the selector 373.

The selector 373 selects either the power addition value Dea received from the right shifter 372 (the right-shifted power addition value Dea) or the power addition value Dea received from the addition unit 350 based on the selection control signal received from the comparator 371. For example, when receiving the selection control signal indicating that the power addition value Dea is 2 or more from the comparator 371, the selector 373 outputs the power addition value Dea received from the right shifter 372 to the divider 374 as a normalized power addition value Dean. When receiving the selection control signal indicating that the power addition value Dea is less than 2 from the comparator 371, the selector 373 outputs the power addition value Dea received from the addition unit 350 to the divider 374 as the normalized power addition value Dean.

The divider 374 is an example of a division operation unit that divides the power subtraction value Des by the normalized power addition value Dea (power addition value Dean). For example, the divider 374 calculates the division value Ddiv by dividing the power subtraction value Des ($=2^F-2^{-I}$) received from the subtraction unit 360 by the power addition value Dean received from the selector 373 (power addition value Dean in which "$2^F+2^{-I}$" is normalized within the range of 1 or more and less than 2). The divider 374 outputs a value Ddive[7:0] which is the exponent portion Ddiv[30:23] of the division value Ddiv to the subtracter 375 and the selector 376. The divider 374 outputs a value Ddivf[22:0] which is the mantissa portion Ddiv[22:0] of the division value Ddiv to a selector 383 of the selection unit 380 (to be described later).

A block including the subtracter 375 and the selector 376 is an example of a correction unit that calculates a division value by correcting the division result by the divider 374 (division operation unit) based on the shift amount by normalization. For example, the subtracter 375 subtracts "1" from the value Ddive[7:0] received from the divider 374 (exponent portion of the division value Ddiv), and outputs the subtraction result to the selector 376. For example, the subtracter 375 outputs the exponent portion of the value obtained by dividing the division value Ddiv by "2" to the selector 376. The value obtained by dividing the division value Ddiv by "2" is a value obtained by dividing the power subtraction value Des ($=2^F-2^{-I}$) by the power addition value Dea ($=2^F+2^{-I}$) when the power addition value Dean is normalized by shifting the power addition value Dea ($=2^F+2^{-I}$) by one bit to the right. For example, when the power addition value Dean is normalized by shifting the power addition value Dea by one bit to the right, the subtracter 375 outputs the exponent portion of the division value Ddiv obtained by dividing the power subtraction value Des by the power addition value Dea before being normalized to the selector 376.

The selector 376 selects either the subtraction result received from the subtracter 375 (arithmetic operation result obtained by subtracting "1" from the value Ddive[7:0]) or the value Ddive[7:0] received from the divider 374 based on the selection control signal received from the comparator 371. For example, when receiving the selection control signal indicating that the power addition value Dea is 2 or more from the comparator 371, the selector 376 outputs the subtraction result received from the subtracter 375 to a selector 382 of the selection unit 380 (to be described later) as the exponent portion of the division value Ddiv. When receiving the selection control signal indicating that the power addition value Dea is less than 2 from the comparator 371, the selector 376 outputs the value Ddive[7:0] received from the divider 374 to the selector 382 as the exponent portion of the division value Ddiv.

In this way, when the power addition value Dean is normalized by shifting the power addition value Dea ($=2^F+2^{-I}$) by one bit to the right, the division result (division value Ddiv) by the divider 374 is corrected based on the shift amount by normalization.

The selection unit 380 includes the determination unit 381 and the selectors 382 and 383. The determination unit 381 determines whether the data x ($=|x|$) transferred from the sign separator 303 to the multiplication unit 310 is 9 or more. The determination unit 381 outputs the determination result that indicates whether the data x ($=|x|$) transferred to the multiplication unit 310 is 9 or more to the selectors 382 and 383 as a selection control signal.

For example, when the data xer[7:0] received from the subtracter 304 is equal to or greater than "8'h04", the determination unit 381 determines that the data x ($=|x|$)

transferred to the multiplication unit 310 is 9 or more. For example, when the value of the exponent portion of the data x (value of the exponent portion after subtracting the bias value (=127)) is 16 or more, the determination unit 381 determines that the data x (=|x|) transferred to the multiplication unit 310 is 9 or more. When the data xer[7:0] is "8'h03" and the data xf[22:0] received from the sign separator 303 is equal to or greater than "23'h10_0000", the determination unit 381 determines that the data x (=|x|) transferred to the multiplication unit 310 is 9 or more. For example, the determination unit 381 determines that the data x (=|x|) transferred to the multiplication unit 310 is 9 or more when the value of the exponent portion of the data x (value of the exponent portion after subtracting the bias value (=127)) is "8" and the value of the mantissa portion of the data x is 1.125 or more.

The selector 382 selects either a value "8'h00" obtained by subtracting the bias value (=127) from the exponent portion in a case of expressing "1" by IEEE 754 or the exponent portion of the division value Ddiv received from the selector 376 based on the selection control signal received from the determination unit 381. For example, when receiving the selection control signal indicating that the data x (=|x|) is 9 or more from the determination unit 381, the selector 382 outputs the value "8'h00" to an adder 391 in the sign reflection unit 390 (to be described later). When receiving the selection control signal indicating that the data x (=|x|) is less than 9 from the determination unit 381, the selector 382 outputs the exponent portion of the division value Ddiv received from the selector 376 to the adder 391 of the sign reflection unit 390.

The selector 383 selects either a value "23'h00_0000" of the mantissa portion in a case of expressing "1" by IEEE 754 or the value Ddivf[22:0] of the mantissa portion of the division value Ddiv received from the divider 374 based on the selection control signal received from the determination unit 381. For example, when receiving the selection control signal indicating that the data x (=|x|) is 9 or more from the determination unit 381, the selector 383 outputs the value "23'h00_0000" as the value yf[22:0] to the sign concatenator 392 in the sign reflection unit 390 (to be described later). When receiving the selection control signal indicating that the data x (=|x|) is less than 9 from the determination unit 381, the selector 383 outputs the value Ddivf[22:0] of the mantissa portion of the division value Ddiv as the value yf[22:0] to the sign concatenator 392 of the sign reflection unit 390.

In this manner, when receiving the selection control signal indicating that the data x (=|x|) is less than 9 from the determination unit 381, the selectors 382 and 383 output "1" as the result of division by the division unit 370 to the sign reflection unit 390.

The sign reflection unit 390 includes the adder 391 and the sign concatenator 392. The adder 391 calculates a value ye[7:0] by adding the value received from the selector 382 (either the value "8'h00" or the exponent portion of the division value Ddiv) and the bias value (=127) of the IEEE 754 expression; and outputs the calculated value ye[7:0] to the sign concatenator 392. The value ye[7:0] is the value of the exponent portion in a case of expressing y[31:0] as the result of executing the arithmetic operation of the hyperbolic tangent function with data x by IEEE 754.

The sign concatenator 392 sets the value indicated by the sign information SIN F received from the sign separator 303 to the sign bit y[31] of the result y[31:0] of executing the arithmetic operation of the hyperbolic tangent function with the data x. Thus, the sign of the data x is reflected in the result of executing the arithmetic operation of the hyperbolic tangent function with the absolute value |x| of the data x. The sign concatenator 392 sets the value ye[7:0] received from the adder 391 to the exponent portion y[30:23] of the result y[31:0], and sets the value yf[22:0] received from the selector 383 to the mantissa portion y[22:0] of the result y[31:0]. Thus, the data that indicates the result y[31:0] (single precision floating point number conforming to IEEE 754) is generated. The sign concatenator 392 stores the generated data y[31:0] (={SIN F, ye[7:0], xy[22:0]} in the storage unit 20.

For example, when the data x is equal to or greater than 9 (predetermined value), the operation unit 34 stores "1" as the result y[31:0] of executing the arithmetic operation of the hyperbolic tangent function with the data x in the storage unit 20, and when the data x is −9 or less, the operation unit 34 stores "−1" as the result y[31:0] in storage unit 20. When the data x is 0 or more and less than 9, the operation unit 34 stores the division value Ddiv calculated using the absolute value |x| of the data x as the result y[31:0] of executing the arithmetic operation of the hyperbolic tangent function with the data x in the storage unit 20. For example, when the data x is less than 0 and greater than −9, the operation unit 34 stores the value obtained by multiplying "−1" by the division value Ddiv calculated using the absolute value |x| of the data x as the result y[31:0] of executing the arithmetic operation of the hyperbolic tangent function with the data x in the storage unit 20.

The configuration of each block in the operation unit 34 is not limited to the example illustrated in FIG. 5. For example, the subtracter 304 may be defined as a block in the selection unit 380. Alternatively, the comparator 371, the right shifter 372, the selectors 373 and 376, and the subtracter 375 may be defined as a block outside the division unit 370.

Here, in the operation unit 34 illustrated in FIG. 5, in a case of adding a function of executing the arithmetic operation of the hyperbolic tangent function to the existing arithmetic processing device including, for example, the multiplier (multiplication unit 310) and the exponentiation operator 332, the scale of a circuit that is newly added may be reduced as compared with a case of using the CORDIC circuit.

For example, a dividend (power subtraction value Des) and a divisor (power addition value Dea) input to the division unit 370 may be generated by adding the second exponentiation unit 340, the addition unit 350, and the subtraction unit 360 to the existing arithmetic processing device. Since the second exponentiation unit 340 may be implemented by a decoder, the circuit scale may be reduced as compared with a shifter in the CORDIC circuit.

For example, since the division result (division value Ddiv) of the division unit 370 is not selected when the absolute value |x| of the data x is 9 or more, the second exponentiation unit 340 may calculate the integer power value Dei when the absolute value |x| is less than 9. Since the constant multiplication value Dmx is less than "9*2/ln 2" (=25.96851 . . . ) when the absolute value |x| is less than 9, the range of the value I is 0 or more and 25 or less. In this case, since the value I is expressed as 5 bits, the second exponentiation unit 340 has a scale of about a circuit including 5 input AND per output 1 bit. In the meantime, in a case where the arithmetic operation of the hyperbolic tangent function is executed with a single precision floating point number using the CORDIC circuit, the shifter (e.g., the shift amount from 1 to 23 bits) in the CORDIC circuit is a scale of about a circuit including 2 input AND and 23 input OR.

The shift amount of the right shifter 372 in the preceding stage of the divider 374 is 1 bit as described above. In the meantime, the shift amount of the shifter that normalizes a hyperbolic cosine function (cos h) calculated by the CORDIC circuit as the divisor of the divider 374 is, for example, about 11 bits at the maximum. Therefore, the operation unit 34 may reduce the circuit scale of the shifter (right shifter 372) that normalizes the divisor to be input to the divider 374 as compared with a case of executing the arithmetic operation of the hyperbolic tangent function using the CORDIC circuit.

As described above, in the embodiment illustrated in FIGS. 3 to 5, it is also possible to obtain the same effects as in the embodiment illustrated in FIG. 1 or FIG. 2. For example, the operation unit 34 executes the arithmetic operation of the hyperbolic tangent function based on Equation (1) described in FIG. 1, for example, the equation that expresses the hyperbolic tangent function "y=tan h(x)" using the value I of the integer portion and the value F of the fractional portion of "2x/ln 2". Thus, the operation unit 34 may execute the arithmetic operation of the hyperbolic tangent function without using the CORDIC circuit. As a result, it is possible to reduce the circuit scale of the arithmetic processing device 14 that executes the arithmetic operation of the hyperbolic tangent function.

In addition, when the absolute value |x| of the data x is equal to or greater than a predetermined value (e.g., "9"), the arithmetic processing device 14 stores "1" or "−1" according to the sign of the data x as the result y[31:0] of executing the arithmetic operation of the hyperbolic tangent function with the data value x in the storage unit 20. For example, the result of the arithmetic operation based on the constant multiplication value Dmx (=2x/ln 2) (e.g., the division value Ddiv) is used when the absolute value |x| of the data x is less than 9. Therefore, in the arithmetic processing device 14, it is possible to limit the range of the value I of the integer portion of the constant multiplication value Dmx (e.g., $0 \leq I \leq 25$) and to reduce the circuit scale of the second exponentiation unit 340.

Figure 6:
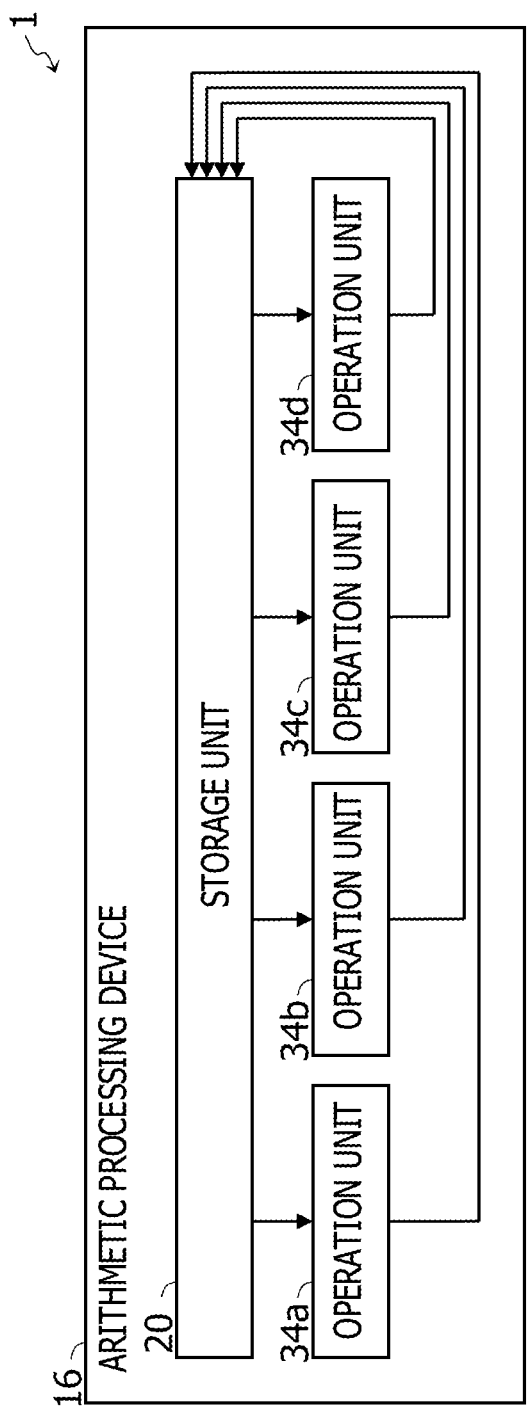
FIG. 6 illustrates an example of an arithmetic processing device and a control method of the arithmetic processing device.

FIG. 6 illustrates an example of an arithmetic processing device and a control method of the arithmetic processing device. The same or similar reference numerals will be given to the same or similar elements as those described in FIGS. 1 to 5, and detailed descriptions thereof will be omitted. The arithmetic processing device 16 illustrated in FIG. 6 is, for example, a processor such as, for example, a CPU and is included in the information processing apparatus 1 such as, for example, a server or a super computer. The arithmetic processing device 16 is the same as or similar to the arithmetic processing device 14 illustrated in FIG. 3 except that the arithmetic processing device 16 includes multiple operation units 34 illustrated in FIG. 5. For example, the arithmetic processing device 16 includes the storage unit 20 such as, for example, the register file which stores the data value x, and multiple operation units 34 (34a, 34b, 34c, and 34d) which execute the arithmetic operation of the hyperbolic tangent function using the data value x stored in the storage unit 20. The multiple operation units 34 arranged in parallel operate as Single Instruction Multiple Data (SIMD) type operators that simultaneously execute the arithmetic operation of, for example, the hyperbolic tangent function or the like based on one instruction.

In addition to the SIMD operation instruction that executes multiplication, calculation of a power of 2 (arithmetic operation of an exponential function with the base of 2), and division at the same time, the arithmetic processing device 16 may execute an SIMD operation instruction that simultaneously executes the arithmetic operation of the hyperbolic tangent function. For example, when the SIMD operation instruction that simultaneously executes the arithmetic operation of the hyperbolic tangent function is issued, the arithmetic processing device 16 transfers four input data of 32 bits from the storage unit 20 to the four operation units 34, respectively. Each of the four operation units 34 executes the arithmetic operation of the hyperbolic tangent function and writes the respective arithmetic operation results (four arithmetic operation results) back to the storage unit 20. The arithmetic processing device 16 completes the SIMD operation instruction that simultaneously executes the arithmetic operation of the hyperbolic tangent function at the time of writing the four arithmetic operation results back to the storage unit 20.

The arithmetic processing device 16 is applied to a calculator that is aimed at an arithmetic processing of a deep neural network using a hyperbolic tangent function, for example, as an activation function. In the deep neural network using the hyperbolic tangent function as the activation function, the arithmetic operation of multiple hyperbolic tangent functions may be required for an arithmetic processing. In addition, since the multiple hyperbolic tangent functions which may be required are not dependent on each other and data is parallel, the arithmetic operation of the multiple hyperbolic tangent functions which may be required is suitable for parallelization by an SIMD method. For example, when an image recognition is executed by the deep neural network using the hyperbolic tangent function as the activation function, the data obtained by executing, for example, a convolution or a matrix multiplication on image data is input in parallel to the four operation units 34. The arithmetic operation results by the four operation units 34 (results of executing the arithmetic operation of the hyperbolic tangent function) are written back to the storage unit 20 as the result of image recognition, for example, by the deep neural network.

The configuration of the arithmetic processing device 16 and the control method of the arithmetic processing device 16 are not limited to the example illustrated in FIG. 6. For example, the arithmetic processing device 16 may include two or three operation units 34. Alternatively, the arithmetic processing device 16 may include five or more operation units 34.

As described above, in the embodiment illustrated in FIG. 6, it is also possible to obtain the same effects as in the embodiment illustrated in FIGS. 3 to 5. For example, it is possible to reduce the circuit scale of the arithmetic processing device 16 that executes the arithmetic operation of the hyperbolic tangent function. In addition, the arithmetic processing device 16 may simultaneously execute the arithmetic operation of the hyperbolic tangent function based on one instruction (SIMD operation instruction).

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. An arithmetic processing device comprising:
   a multiplier circuit configured to identify a constant multiplication value by multiplying a data value and a constant value which is obtained by dividing a first value by a natural logarithm of 2;
   an exponentiation operator circuit configured to separate the constant multiplication value into an integer portion and a fractional portion, and identify a fractional power value expressed as a power of 2 having a value of the fractional portion of the constant multiplication value as an exponent; and
   a divider circuit configured to identify a division value by dividing a power subtraction value by a power addition value as a result of an execution of an arithmetic operation of a hyperbolic tangent function with the data value,
   an addition circuit configured to identify the power addition value by adding the fractional power value and an integer power value expressed as a power of 2 having a value obtained by multiplying a value of the integer portion of the constant multiplication value by a second value as an exponent,
   an addition circuit configured to identify the power subtraction value by subtracting the integer power value from the fractional power value, and
   the integer power value is identified by decoder processing performed by a processor included in the arithmetic processing device.

2. The arithmetic processing device according to claim 1, wherein the first value is "2".

3. The arithmetic processing device according to claim 1, wherein the second value is "−1".

4. The arithmetic processing device according to claim 1, further comprising:
   a memory; and
   a processor coupled to the memory and the processor configured to:
      shift and normalize the power addition value which is expressed by a predetermined number of bits;
      divide the power subtraction value by a normalized power addition value; and
      calculate the division value by correcting a result of the division based on a shift amount by the normalization.

5. The arithmetic processing device according to claim 4, wherein the processor is configured to shift the power addition value by the shift amount that keeps a divisor of the division within a predetermined range.

6. The arithmetic processing device according to claim 1, further comprising:
   a memory; and
   a processor coupled to the memory and the processor configured to select either the second value or a third value according to a sign of the data value regardless of the division value as the result of the execution of the arithmetic operation of the hyperbolic tangent function with the data value when an absolute value of the data value is equal to or greater than a predetermined value.

7. The arithmetic processing device according to claim 6, wherein the second value is "−1" and the third value is "1".

8. A control method of an arithmetic processing device comprising:
   identifying, by a multiplier circuit, a constant multiplication value by multiplying a data value and a constant value which is obtained by dividing a first value by a natural logarithm of 2;
   separating, by an exponentiation operator circuit, the constant multiplication value into an integer portion and a fractional portion, and identify a fractional power value expressed as a power of 2 having a value of the fractional portion of the constant multiplication value as an exponent; and
   identifying, by a divider circuit, a division value by dividing a power subtraction value by a power addition value as a result of an execution of an arithmetic operation of a hyperbolic tangent function with the data value,
   the power addition value is identified by adding the fractional power value and an integer power value expressed as a power of 2 having a value obtained by multiplying a value of the integer portion of the constant multiplication value by a second value as an exponent,
   the power subtraction value is identified by subtracting the integer power value from the fractional power value, and
   the integer power value is identified by decoder processing performed by a processor included in the arithmetic processing device.

9. The control method according to claim 8, wherein the first value is "2".

10. The control method according to claim 8, wherein the second value is "−1".

11. The control method according to claim 8, further comprising:
    shifting and normalizing the power addition value which is expressed by a predetermined number of bits;
    dividing the power subtraction value by a normalized power addition value; and
    calculating the division value by correcting a result of the division based on a shift amount by the normalization.

12. The control method according to claim 11, wherein the power addition value is shifted by the shift amount that keeps a divisor of the division within a predetermined range.

13. The control method according to claim 8, further comprising:
    selecting either the second value or a third value according to a sign of the data value regardless of the division value as the result of the execution of the arithmetic operation of the hyperbolic tangent function with the data value when an absolute value of the data value is equal to or greater than a predetermined value.

14. The control method according to claim 13, wherein the second value is "−1" and the third value is "1".

15. An arithmetic processing device comprising:
    a multiplication unit for calculating a constant multiplication value by multiplying a constant value obtained by dividing a first value by a natural logarithm of 2 and a data value stored in a memory;
    a separation unit for separating the constant multiplication value into an integer portion and a fractional portion;
    a first exponentiation unit for calculating a fractional power value expressed as a power of 2 having a value of the fractional portion of the constant multiplication value as an exponent;

a second exponentiation unit for calculating an integer power value expressed as a power of 2 having a value obtained by multiplying a value of the integer portion of the constant multiplication value by a second value as an exponent;

an addition unit for calculating a power addition value by adding the fractional power value and the integer power value; a subtraction unit for calculating a power subtraction value by subtracting the integer power value from the fractional power value; and a division unit for calculating a division value by dividing the power subtraction value by the power addition value as a result of an execution of an arithmetic operation of a hyperbolic tangent function with the data value.

* * * * *